United States Patent Office 3,432,046
Patented Mar. 11, 1969

3,432,046
TRANSFER MEANS FOR A LOAD CARRIER IN A STORAGE SYSTEM
Joseph Krusinski, Cleveland, Ohio, assignor to The Triax Company, Cleveland, Ohio, a corporation of Ohio
Filed Sept. 8, 1966, Ser. No. 578,020
U.S. Cl. 214—16.4　　　　　　　　　　　　7 Claims
Int. Cl. B65g *1/00, 57/00;* B66c *17/02*

ABSTRACT OF THE DISCLOSURE

A warehouse system with a plurality of storage bays with aisles therebetween, a load carrier movable in said aisles and having means thereon to remove or deposit a load in the storage bays, and a transfer means located adjacent the end of the aisle for transferring the load carrier to a selected aisle.

---

This invention relates in general to automatic warehousing systems for storing or unstoring loads by transferring them between a movable load carrier and a storage frame, and more particularly relates to a warehousing system comprised of a plurality of storage bays or storage sections, with a pickup and discharge station located at one end of each of said bays or storage sections, and with the load carrier servicing a plurality of said bays.

It is known in the automatic warehousing art to provide a warehousing system which includes a pair of laterally spaced, parallel extending storage bays defining a travel zone and with a powered load carrier movable in the travel zone alongside the storage bays, for inserting loads into and removing loads from the storage bays.

The present invention provides a warehousing system which includes a plurality of travel zones with storage sections disposed on one or both sides of each of the travel zones, and with there being provided at least one load carrier for servicing the storage sections of all of the travel zones, and including means for transferring the load carrier from one travel zone to another travel zone, with there being pickup and discharge station means associated with each of the travel zones, so that loads to be deposited into or which are withdrawn from the warehousing system can be positioned at the individual pickup and discharge stations associated with each of the travel zones and await further handling. In this way, a more efficient warehousing system is provided, and in the case where more than one load carrier is utilized, one or more of the load carriers can be depositing loads into or withdrawing loads from the storage sections of the warehousing system while the other load carrier or load carriers can be picking up loads from one or more of the pickup and discharge stations or depositing loads back onto the pickup and discharge stations.

Accordingly, it is an object of the present invention to provide a novel warehousing system.

Another object of the invention is to provide a novel warehousing system which includes a plurality of storage bays or sections defining a plurality of travel zones therebetween, in which a load carrier is movable for inserting loads into or removing loads from the storage bays, and wherein means is provided for transferring the load carrier from one travel zone to another travel zone for servicing of the storage bays associated with each respective travel zone.

Another object of the invention is to provide a warehousing system of the aforementioned type, wherein a pickup and discharge station is associated with each of the storage bays, preferably at one end thereof, for servicing the respective storage bay.

A still further object of the invention is to provide a novel warehousing system which includes a plurality of storage bays and a travel zone alongside each of the storage bays, and with pickup and discharge station means associated with each of the storage bays, and with the storage bays being serviced by at least one powered load carrier movable in the travel zones for inserting loads into or removing loads from the storage bays, and wherein transfer means is provided for readily transferring the load carrier from one travel zone to another travel zone and thus provide for the servicing of a plurality of the storage bays by a single load carrier.

A still further object of the invention is to provide a novel warehousing system which includes a plurality of parallel extending, laterally spaced storage bays defining travel zones alongside each of the spaced storage bays, and with one or more powered load carriers movable in the travel zones for inserting loads into or removing loads from the storage bays and wherein a transfer gantry is provided for receiving a load carrier and transferring the latter from one travel zone to another travel zone.

A still further object of the invention is to provide a novel warehousing construction adapted for servicing by a load carrier movable in spaced, parallel extending aisles between bays of storage bins in the warehouse, and wherein a novel transfer gantry is provided for receiving the load carrier and transferring it from one aisle to another aisle, whereby the load carrier can expeditiously move in a plurality of the aisles, and thus service a plurality of the bays of storage bins.

Other objects and advantages of the invention will be apparent from the following description taken in conjunction with the accompanying drawings wherein.

Figure 5:
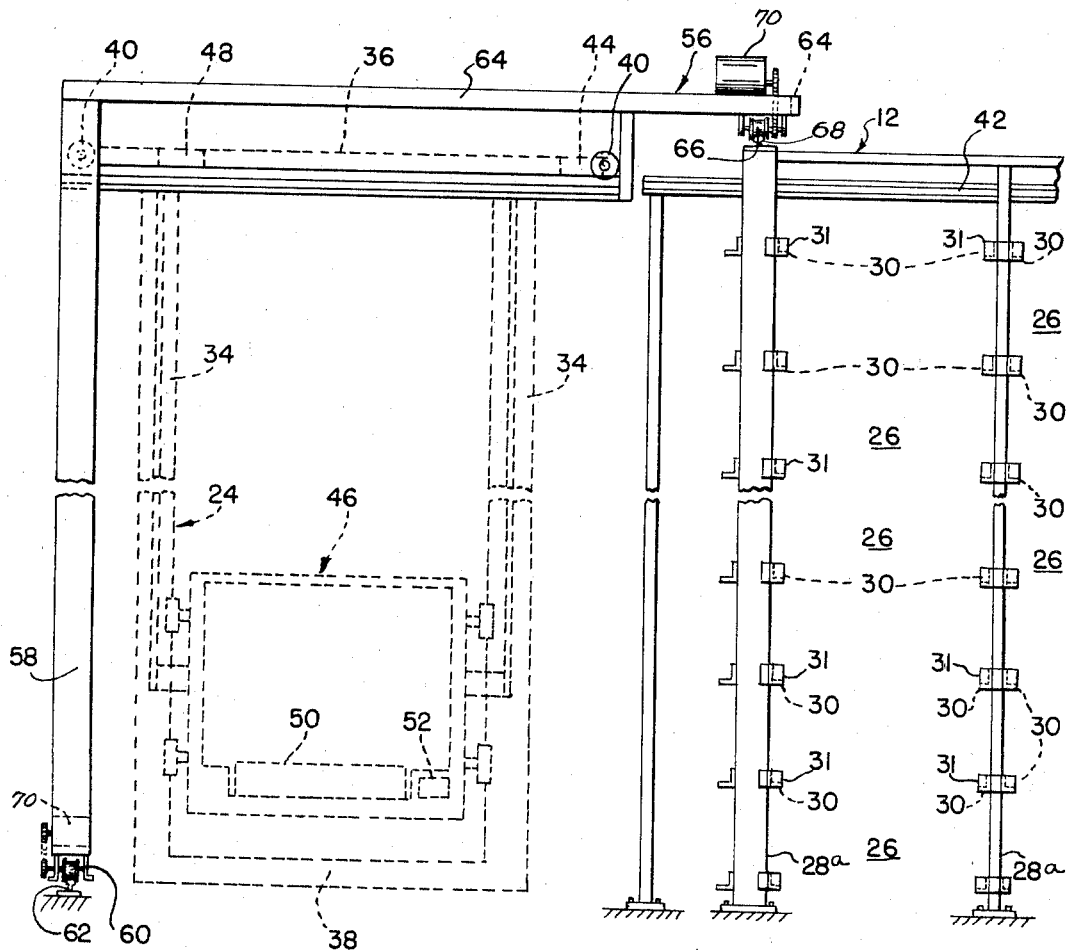
Figure 6:
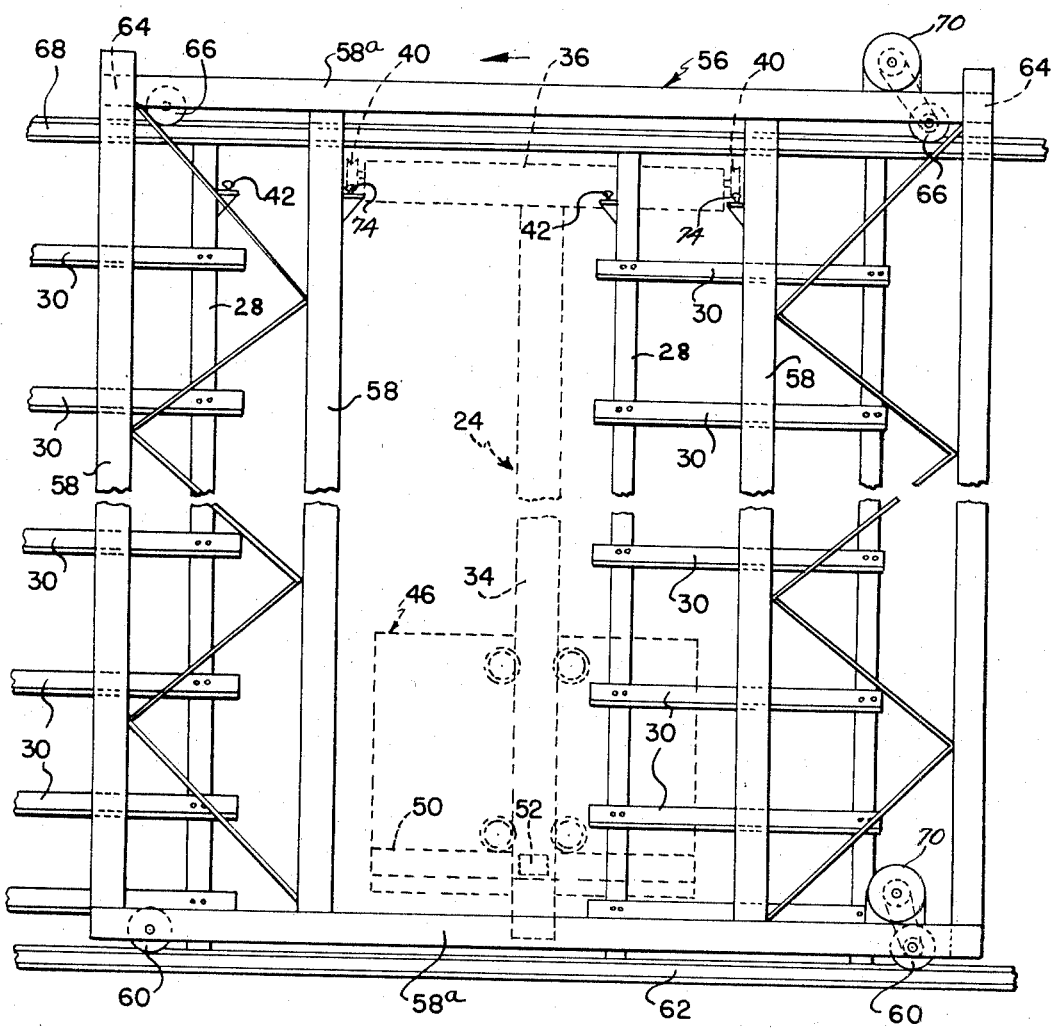

FIGURE 5 is an enlarged side elevational view of the powered transfer mechanism for transferring the load carrier (shown in phantom lines) from one travel zone to another travel zone for servicing various of the storage frame sections of the warehousing system; and FIGURE 6 is an enlarged rear end elevational view of the FIGURE 5 illustration, and illustrating the movement of the transfer mechanism and supported load carrier toward a position wherein the load carrier will be aligned with the tracks on the storage frame sections for movement of the load carrier alongside such storage frame sections.

Referring now again to the drawings, the warehousing system may comprise, a plurality of generally parallel storage bay sections 12, 12a, 14, 14a, 16, 16a, 18, 18a, 20 and 20a defining between each pair thereof, an aisle or travel zone 22 so as to permit a motorized load carrier indicated generally at 24, to be moved along the aisle or travel zone and to insert a load into or withdraw a load from the load support means or storage bins 26 formed by the storage bays 12 through 20a.

Each storage bay may be constructed of a plurality of vertically extending laterally spaced posts 28, 28a spaced apart by a plurality of generally horizontally extending load supporting rails 30 defining a plurality of the aforementioned storage bins. Stops 31 may be provided at the outer ends of rails 30 for preventing the inadvertent movement of a load completely through the selected bin. The storage frame construction may be generaly similar to that disclosed in the assignee's copending U.S. patent application, Ser. No. 484,845, filed Sept. 3, 1965 in the name of Anthony R. Chasar and entitled "Automatic Warehousing System," and reference may be had thereto for a more detailed discussion of structural details of suitable warehousing storage frame.

Disposed at one end of preferably each of the storage bays 12 through 20a there may be provided a pickup and discharge station 32 which is adapted for receiving the load to be handled by the load carrier 24 prior to moving such load into the travel zone by the load carrier, and for receiving a load from the load carrier after such load has been removed from a selected bin by the load carrier and return to the pickup and discharge station. The load carrier may also pick up a load in one storage bay section and transfer it to another storage bin in the same storage bay or to a bin in another storage bay.

The load carrier 24 may comprise generally upright mast structure formed by a pair of generally vertically extending preferably hollow track members 34, with the mast structure being secured to an upwardly disposed carriage frame 36 in depending relation therefrom. The lower ends of members 34 may be connected by cross piece 38 to provide a generally rigid structure. Carriage 36 may bridge the distance across the respective aisle, and in this connection may have wheels 40 at the sides thereof adapted for disposal in rolling engagement on tracks 42 carried by the respective laterally spaced storage frames or bays, and supporting the load carrier on the tracks 42 for horizontal movement. This horizontally movable structure of the load carrier may be referred to as the conveyor portion of the load carrier. Suitable power means such as for instance an electric motor 44 (FIGURE 5) operatively coupled to the wheels 40 may be provided for causing horizontal movement of the load carrier 24 in the respective travel zone.

The load carrier may also include a vertically movable elevator 46 adapted for movement along the vertical tracks 34 of the mast structure, to substantially the full height of the storage frame. Suitable power means such as an electric motor 48 (FIGURE 5) may be provided in a known manner for actuating the elevator in its vertical movement. The elevator may mount a load supporting platform or extractor 50, which preferably provides an extensible table with the table being extendible in either of the opposed directions transverse to the direction of the movement of the load carrier in the traveling zone, so as to locate the extractor within either of the storage bays associated with each travel zone, effective to place the extensible table in position to deposit a load into or remove a load from a selected storage bin in the selected storage bay. Suitable power means, such as an electric motor 52 (FIGURE 6) may be provided, operatively coupled to the extractor 50, for actuating the latter. Reference may be had to the aforementioned U.S. patent application, Ser. No. 484,845, for a more detailed disclosure of a suitable extendible extractor mechanism.

When depositing a load in one of the storage bins of the storage frame, the elevator 46 and associated extractor 50 may be located opposite the selected storage bin such that as the load is moved into the selected storage bin, the upper surface of the extractor is slightly above the horizontal flanges of the load supporting rails 30 mounted on the sides of and defining the bottom extremity of the respective bin. When the load is completely within the confines of the bin, the elevator 46 may be lowered slightly to deposit the load onto the supporting rail members and permit retraction of the extractor back to its centered relationship with respect to the elevator. Conversely, when it is desired to remove a load from a selected storage bin, the elevator may be located such that the upper surface of the extractor when extended into the bin is slightly below the load. Thereafter, the elevator is raised so as to lift the load off the supporting rail members defining the respective storage bin, and then the extractor may be moved back to its centered condition with respect to the elevator. Thereafter, the load carrier is adapted to move to the pickup and discharge station associated with the respective travel zone and deposit the load on the station, from whence it is ready for further handling.

With the load carrier disposed at a pickup and discharge station located in the embodiment illustrated at the forward end of each of the storage bays of the storage frame, the load carrier may be automatically moved into the selected aisle and located opposite the selected storage bin or bins in the storage bays associated with each of the aisles. At the selected bin during this control interval, the extractor 50 may be actuated so that a load is deposited in or withdrawn from the selected bin. The load carrier may be located sequentially opposite two storage bins in either of the storage bay sections associated with the respective travel zone and as described for instance, in U.S. patent application, Ser. No. 418,048, filed Dec. 14, 1964 in the name of Sanford Saul and entitled "Electrical Control Circuit for an Automatic Warehousing System." For example, the load may be deposited in a bin at a first load handling position and another load withdrawn from a bin at a second load handling position and conveyed back to the respective pickup and discharge station.

In accordance with the present invention, transfer means 56 is provided for transferring the load carrier from one travel zone and the storage bays associated with that travel zone, to another travel zone, whereby the load carrier can expeditiously operate in more than one travel zone and thus service a considerable number of storage bays in the warehousing system. Such transfer means in the embodiment illustrated, comprises a gantry-like framework including vertically extending columns 58 connected by upper and lower cross members 58a. Lower cross-member 58a may have rollers or flanged wheels 60 mounted thereon for rolling coaction with a rail member 62 disposed in rearwardly spaced relationship with the rear ends of the storage frame sections, and extending transverse to the direction of extension of the aisles 22. The transfer gantry may also include a top frame portion including generally horizontal stringers 64 which may have flanged wheels 66 rotatably mounted thereon, adapted for rolling coaction with a rail 68 mounted on the rear end of the storage frame sections and extending transverse to the direction of extension of aisles 22, thus providing for rolling movement of the transfer gantry with respect to the storage frame sections. As can be readily seen, the transfer gantry moves transversely of the direction of extension of aisles 22 and may be aligned with the selected of the aisles. Power means such as for instance synchronized reversible electric motors 70 may be operatively coupled to wheels 60, 66 for driving the transfer gantry. Braking means of any suitable type, such as conventional electro-responsive brakes may be associated with the motors 70 for accurately stopping the movement of the transfer gantry 56. As may be best seen in FIGURE 5 stringers 64 reach over and extend above the outwardly extending ends of rails 42 mounted on the storage frame sections.

Mounted in generally suspended relation on the transfer gantry may be a pair of generally horizontal tracks 74 on which the wheels 40 of the load carrier carriage 36 are adapted to move, so as to locate or support the load carrier completely on the transfer gantry. Tracks 74 are adapted to be disposed at the same elevation and in alignment with the tracks 42 on the storage frame sections, tracks 42 being adapted to mount the load carrier thereon for guiding and supporting the movement of the load carrier in the respective storage frame aisle. Thus when the transfer gantry is aligned with the selected aisle, the rails 74 on the transfer gantry are aligned with the rails 42 of the selected aisle.

Accordingly, when the transfer gantry is aligned with the selected aisle, and thus the rails 42 associated with the respective storage bay sections are aligned with the rails 74 on the gantry, actuation of the motor means 44 for driving the carriage of the load carrier will cause the load carrier 24 to move smoothly from the gantry rails 74 onto the guide rails 42 of the selected storage bay aisle, thus placing the load carrier in position to service the selected storage bay sections.

Movement of the load carrier 24 and movement of the elevator 46 and extractor 50 thereof, as actuated by the respective power means 44, 48 and 52, are all preferably automatically actuated in a predetermined series of simultaneous or sequential movements, to store or retrieve a load, and as by means of an automatic control system of the general type disclosed in the aforementioned copending U.S. patent application Serial No. 418,048.

Figure 1:
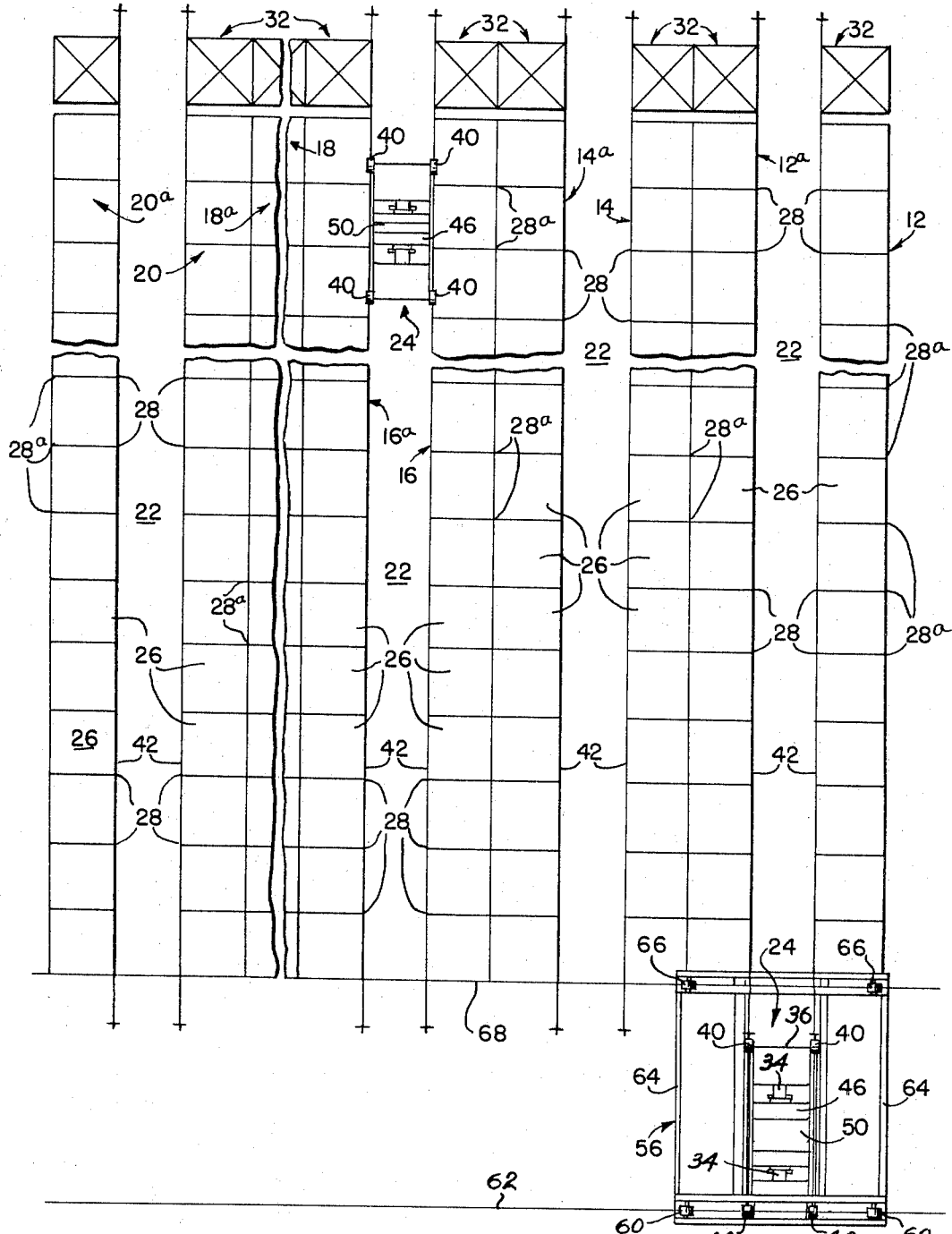
FIGURE 1 is a top plan generally diagrammatic illustration of a warehousing system embodying the present invention.
Figure 2:
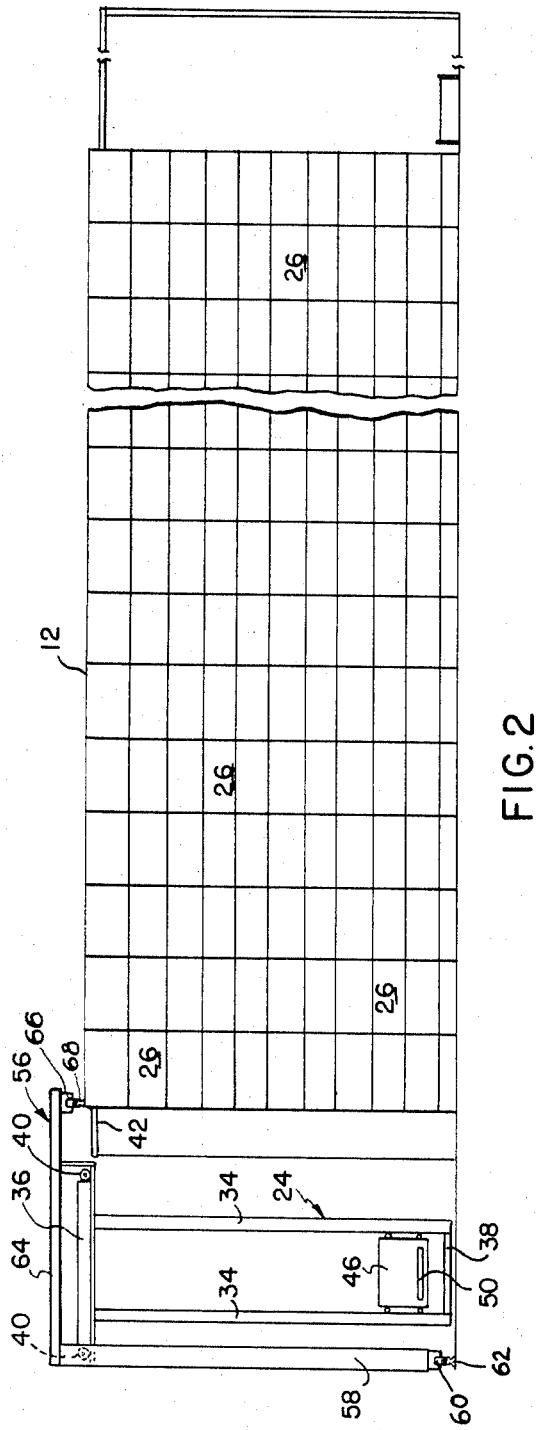
FIGURE 2 is a side elevational view of the system illustrated in FIGURE 1.
Figure 3:
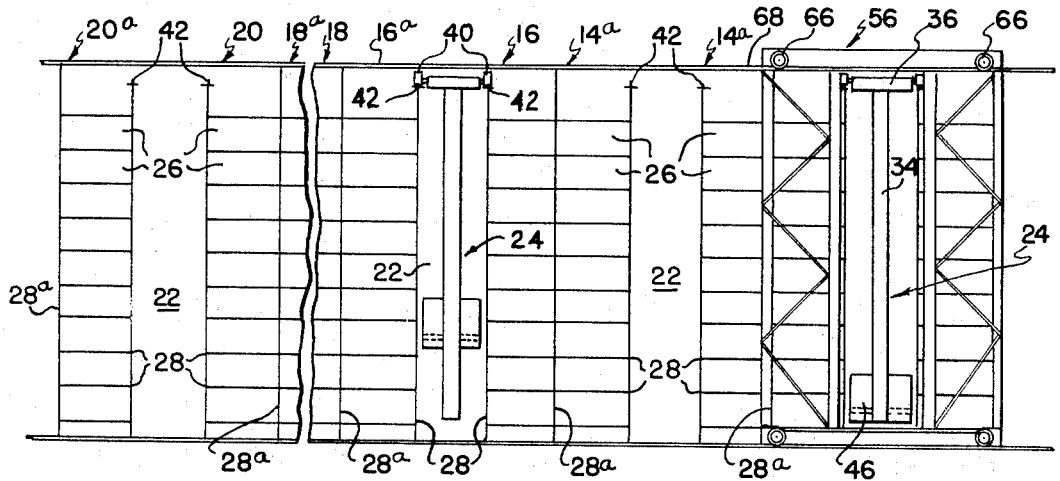
FIGURE 3 is a rear end elevational view of the system illustrated in FIGURE 1, or in other words a view taken from the bottom of the sheet of FIGURE 1.
Figure 4:
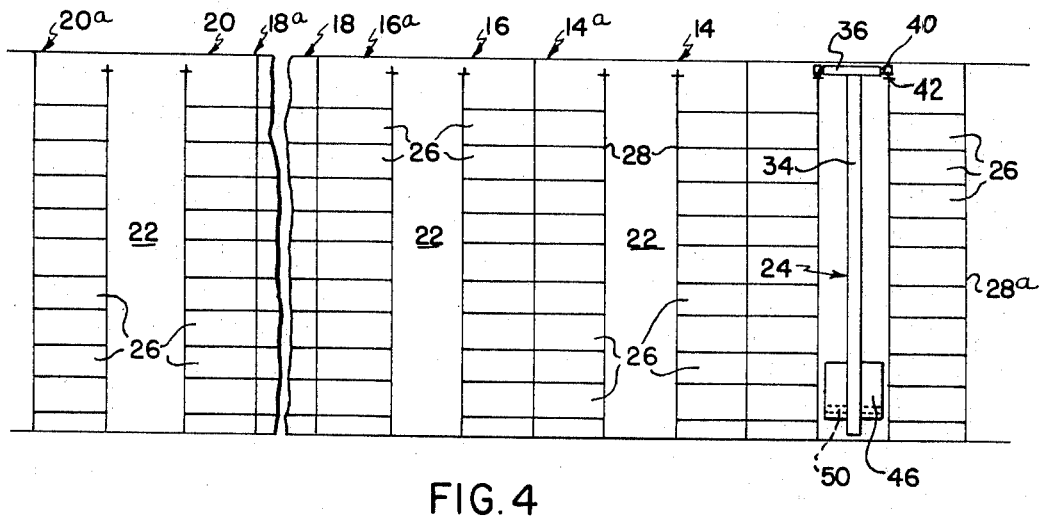
FIGURE 4 is a front end elevational view of the system illustrated in FIGURE 1, or in other words a view taken from the top of the sheet of FIGURE 1.

Referring now again to FIGURE 1, there is illustrated a plurality of load carriers 24 for servicing the warehousing system. The load carriers may be of the construction aforedescribed and are adapted to move in the aisles defined by the storage bay sections. The advantage of having two or more load carriers is that one of the load carriers can be disposed at the selected pickup and discharge station 32 for loading a load thereon or discharging a load therefrom, while the other load carrier or load carriers can be depositing or retrieving loads from the selected storage bins in the selected storage bay sections. Accordingly, a plurality of operations can be maintained at the same time in the system, materially increasing the speed at which loads are handled in the system.

The pickup and discharge stations may be of the type shown and described in the aforementioned copending patent application 484,845 and may include means wherein a load can be conveniently raised or lowered for positioning on the extractor mechanism of the load carrier, and such pickup and discharge stations may include endless belt or conveyor systems to convey the loads to and from the stations 32.

From the foregoing discussion and accompanying drawings it will be seen that the invention provides a novel warehousing system, and one wherein a mobile load carrier is provided for servicing a plurality of aisled storage bays of the system, and by means of a transfer means for readily transferring a load carrier from one aisle or travel zone to another aisle in the system, and also a warehousing system wherein pickup and discharge stations are associated with each of the storage bays in the system so that the handling of loads in the warehousing system is greatly expedited. The invention also provides a warehousing system wherein two or more load carriers may be provided in conjunction with said transfer means for greatly expediting the handling of loads in the system.

I claim:

1. In a warehousing system comprising a plurality of storage bays, said storage bays defining a plurality of generally parallel extending travel zones along which the storage bays are disposed, load carrier means movable in said travel zones for depositing loads into or removing loads from the respective storage bays, pick-up and discharge station means located adjacent an end of said travel zones, elongated guide means supported by said storage bays for guiding the movement of said load carrier means in each of said travel zones, said guide means extending in the same direction of lengthwise extension as the respective travel zone, said load carrier means comprising a powered load carrier including a generally horizontally movable conveyor portion, an elevator portion movable vertically on said conveyor portion, and an extensible extractor portion mounted on said elevator portion and movable generally transversely of the associated travel zone into and out of the respective storage bay at each load handling position, for selectively depositing a load into or removing a load from the last mentioned storage bay, and transfer means disposed at an end of said travel zones, said transfer means comprising a mobile mechanism movable transversely of the lengthwise direction of extension of said travel zones and having means thereon for supporting said load carrier during transference of the latter from one travel zone to another tavel zone, the last mentioned supporting means comprising an elongated track extending in the direction of lengthwise extension of said travel zones and being disposed at the same level as the level of said guide means on said storage bays, said transfer means comprising a generally vertically oriented outermost side frame and a top frame attached to said side frame and extending inwardly from said side frame toward said storage bays, said side frame having traction means thereon disposed in rolling coaction with track means extending in a direction transverse to the direction of lengthwise extension of said travel zones, and movably supporting said transfer means thereon, other track means supported by said storage bays at a level above the level of said guide means on said storage bays and at a level above the uppermost extremity of said load carrier, said other track means extending parallel to the first mentioned track means, said top frame having traction means thereon disposed in rolling coaction with said other track means for movably supporting said transfer means on said storage bays, said track of said last mentioned supporting means being disposed downwardly from said top frame and adapted at its inner end to be disposed in closely adjacent aligned relation to said guide means on said storage bays of a selected travel zone when a load carrier is moved by said transfer means into aligned relation with the selected travel zone, said track supporting said load carrier inwardly of said side frame during transference of said load carrier by said transfer means from one travel zone to another travel zone.

2. A system in accordance with claim 1 wherein said guide means on said storage bays have overhanging ends extending outwardly from the end of the respective travel zone in a direction toward said transfer means, said track of said last mentioned supporting means being disposed in suspended relation from said top frame, and said top frame extending inwardly toward said storage bays into overlapping vertically spaced relation to said overhanging ends, said other track means being disposed inwardly of said overhanging ends.

3. A system in accordance with claim 2 wherein said traction means on said top frame and said traction means on said side frame each have motor units drivingly connected thereto, said motor units being coupled into synchronism for simultaneous driving of said top and side frames in a predetermined direction.

4. A system in accordance with claim 2 wherein said conveyor portion includes a mobile horizontally movable carriage adapted for mounting on said guide means on the storage bays, and providing for movement of said load carrier along the respective travel zone to selectively position the load carrier at a selected load handling location.

5. A system in accordance with claim 2 wherein said load carrier means comprises a plurality of individually movable powered load carriers, movable in said system, each of said load carriers being movable from one of said travel zones to another travel zone by said transfer means.

6. In a warehousing system comprising a plurality of storage bays, said storage bays defining a plurality of generally parallel extending travel zones along which the storage bays are disposed, load carrier means movable in said travel zones for depositing loads into or removing loads from the respective storage bays, pick-up and discharge station means located adjacent an end of said travel zones, elongated guide means supported by said storage bays for guiding the movement of said load carrier means in each of said travel zones, said guide means extending in the same direction of lengthwise extension as the respective travel zone, said load carrier means comprising a powered load carrier including a generally horizontally movable conveyor portion, an elevator portion movable vertically on said conveyor portion, and an extensible extractor portion mounted on said elevator portion and movable generally transversely of the associated travel zone into and out of the respective storage bay at each load handling position, for selectively depositing a load into or removing a load from the last mentioned storage bay, and transfer means disposed at an end of said travel zones, said transfer means comprising a mobile mechanism movable transversely of the lengthwise direction of extension of said travel zones and having means thereon for supporting said load carrier during transference of the latter from one travel zone to another travel zone, the last mentioned supporting means comprising an elongated track extending in the direction of lengthwise extension of said travel zones and being disposed at the same level as the level of said guide means on said storage bays, said transfer means comprising a generally vertically oriented outermost side frame and a top frame attached to said side frame and extending inwardly from said side frame toward said storage bays, said side frame having traction means thereon disposed in rolling coaction with track means extending in a direction transverse to the direction of lengthwise extension of said travel zones, and movably supporting said transfer means thereon, other track means supported by said storage bays at a level above the level of said guide means on said storage bays and at a level above the uppermost extremity of said load carrier, said other track means extending parallel to the first mentioned track means, said top frame having traction means thereon disposed in rolling coaction with said other track means for movably supporting said transfer means on said storage bays, said guide means on said storage bays having overhanging ends extending outwardly from the end of the respective travel zone in a direction toward said transfer means, said top frame extending inwardly toward said storage bays into overlapping vertically spaced relation to said overhanging ends, said other track means being disposed inwardly of said overhanging ends.

7. A system in accordance with claim 6 wherein said traction means on said top frame is mounted on the underside of said top frame in overlying engaged relation to said other track means.

References Cited

UNITED STATES PATENTS

| | | |
|---|---|---|
| 1,927,677 | 9/1933 | Bennington. |
| 2,847,131 | 8/1958 | Miller _____ 214—16.1 |
| 3,219,207 | 11/1965 | Chasai. |
| 3,294,260 | 12/1966 | Frangos. |

FOREIGN PATENTS

| | | |
|---|---|---|
| 154,013 | 9/1951 | Australia. |
| 120,169 | 10/1918 | Great Britain. |
| 177,859 | 3/1922 | Great Britain. |
| 1,317,152 | 12/1962 | France. |

GERALD M. FORLENZA, Primary Examiner.

R. B. JOHNSON, Assistant Examiner.

U.S. Cl. X.R.

212—11; 104—48